(12) United States Patent
Deraedt

(10) Patent No.: US 6,418,674 B1
(45) Date of Patent: Jul. 16, 2002

(54) BIRD REPELLANT METHOD AND SYSTEM

(76) Inventor: Robert Deraedt, 5524 N. Artesian, Chicago, IL (US) 60625

( * ) Notice: Subject to any disclaimer, the term of this patent is extended or adjusted under 35 U.S.C. 154(b) by 0 days.

(21) Appl. No.: 09/452,240

(22) Filed: Dec. 1, 1999

(51) Int. Cl.$^7$ ................................................. E04B 1/72
(52) U.S. Cl. ............................... 52/101; 52/25; 256/11; 256/12; 256/52; 119/903; 248/121; 248/126; 248/314; 248/315; 248/353; 182/4; 182/113
(58) Field of Search ....................... 52/101, 25; 256/11, 256/12, 52; 119/903; 248/121, 126, 314, 315, 353; 182/4, 113

(56) References Cited

U.S. PATENT DOCUMENTS

| | | | |
|---|---|---|---|
| 1,233,230 A | * | 7/1917 | Hassett .......................... 52/101 |
| 2,142,371 A | | 1/1939 | Peles |
| 2,938,243 A | | 5/1960 | Peles |
| 4,602,764 A | * | 7/1986 | Cacicedo ...................... 256/11 |
| 4,841,914 A | | 6/1989 | Chatten |
| 4,962,619 A | | 10/1990 | Chatten |
| 5,092,088 A | | 3/1992 | Way |
| 5,400,552 A | | 3/1995 | Negre |
| 5,451,239 A | | 9/1995 | Sewell et al. |
| 5,691,032 A | | 11/1997 | Trueblood et al. |
| 5,713,160 A | | 2/1998 | Heron |
| 6,003,471 A | * | 12/1999 | Ohba ........................... 52/101 |

* cited by examiner

Primary Examiner—Carl D. Friedman
Assistant Examiner—Dennis L. Dorsey
(74) Attorney, Agent, or Firm—Fitch, Even, Tabin & Flannery

(57) ABSTRACT

The present invention is directed to a line barrier system and method of installing such a system which includes, a plurality of modular supports having a base for mounting to the structure, with the supports having at least one projecting member extending in a fixed position from said base; a fastener for mounting said plurality of modular supports to the structure; and, at least one generally translucent line fixedly attached to said projecting member on more than one of said plurality of modular supports to provide a line barrier between the bird and the structure.

27 Claims, 2 Drawing Sheets

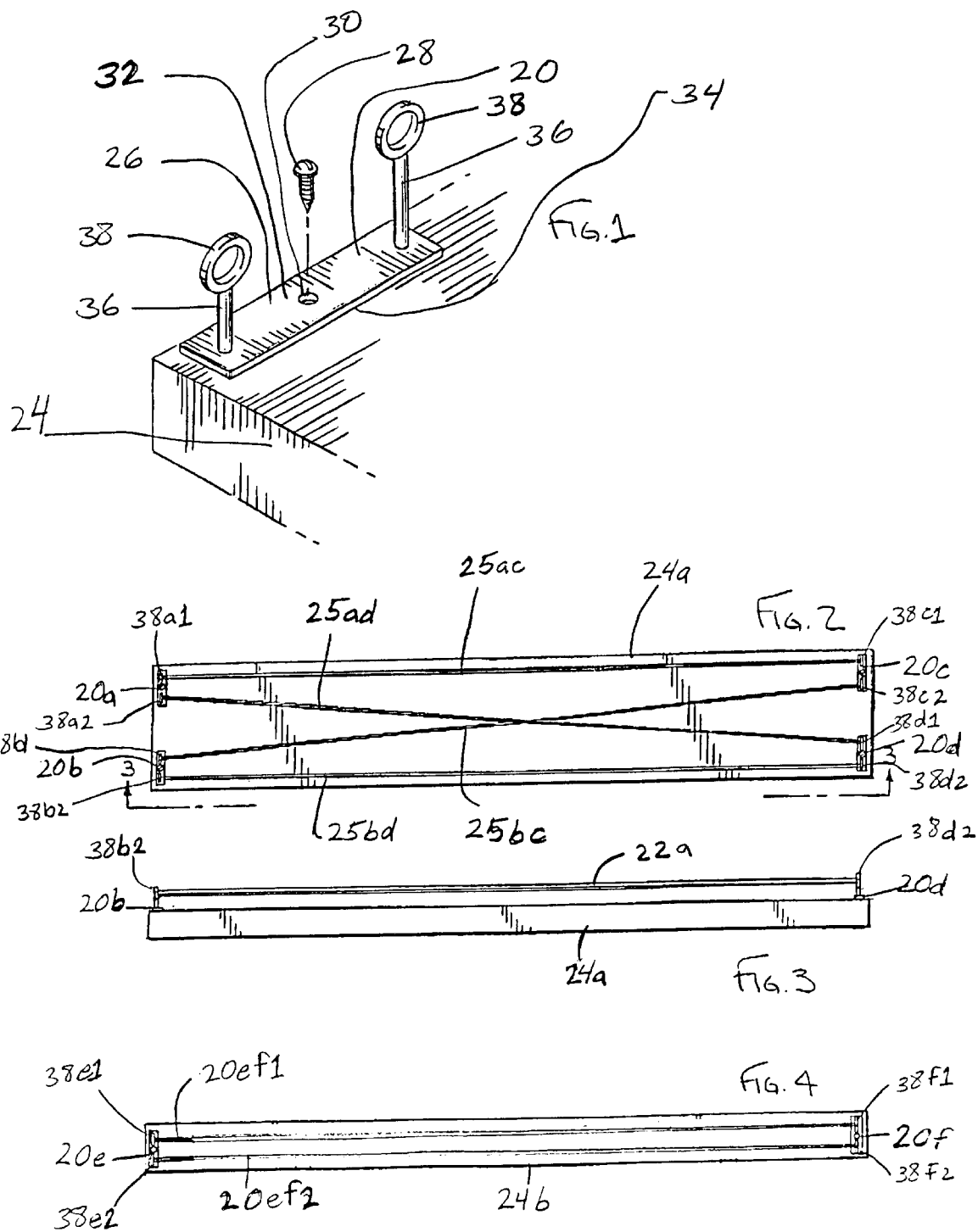

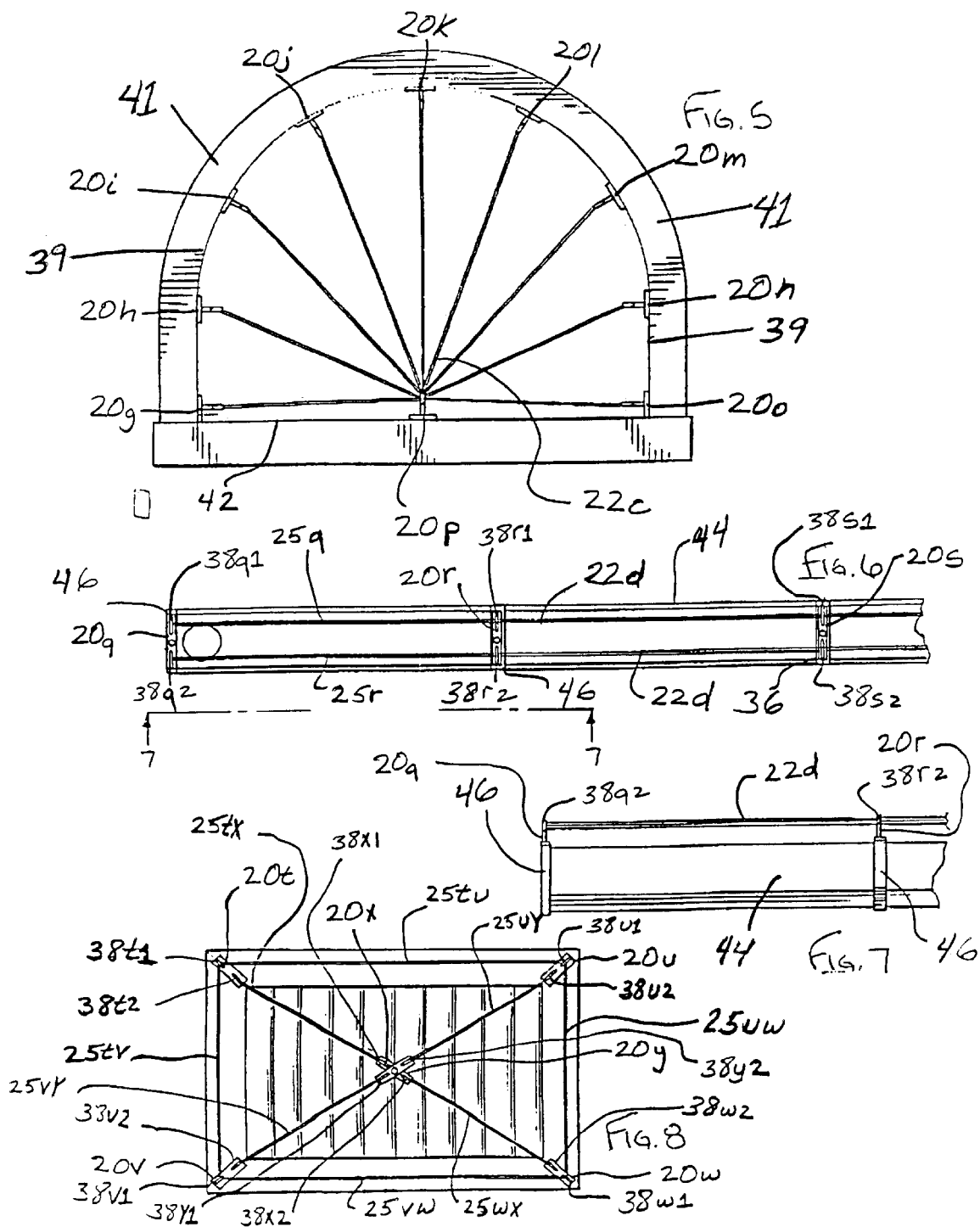

BIRD REPELLANT METHOD AND SYSTEM

FIELD OF THE INVENTION

The invention relates to a system and method for repelling birds from landing, roosting and/or nesting on surfaces of outdoor structures or from entering into openings in outdoors structures.

BACKGROUND OF THE INVENTION

It is well known that birds often roost, build nest and/or congregate on window ledges, fences, bell towers, gutters, roof tops, air conditioner units, light poles and a variety of other outdoor structures. Such congregations of birds can be a nuisance to property owners as well as to the general public. For example, in urban settings, large numbers of pigeons tend to inhabit any structure which offers some shelter and an opening that provides a means of egress for the birds. Such open structures can become a repository for large quantities of bird droppings. Bird droppings often become unsightly, malodorous and unsanitary and, therefore, require frequent cleaning of the area of accumulation.

In the past, there have been several attempts to devise a system to solve the problem of bird nuisance landing, nesting and roosting. One example of such a system is U.S. Pat. No. 5,713,160, issued to Heron, which discloses a retractable bird deterring device. The deterring device included holding mechanisms having a base plate attached to the building and pivotally mounted arms for securing wire between the wire holding mechanisms. The arms are selectively pivotable to an operational protracted position in which the arms and wire lie above the surface of the building and to a non-operational retractable position in which the arms and wire lie below the surface of the building structure.

Another attempt to solve the problem is disclosed in U.S. Pat. No. 5,092,088 issue to Way which discloses a device for deterring birds from roosting or nesting on building ledges and the like. The device comprises opposing brackets mounted on the ledge with one or more wires linking the opposing faces of the brackets and positioned so that when the device is in its assembled position the wires obstruct the roosting or nesting activities of the bird. One of the brackets has one or more wire retracting means enclosed within it to which the wires are mounted so that the length and tension on the wires are adjusted, either separately or collectively.

The previous attempts to provide a barrier system for repelling birds have been found to suffer from a number of drawbacks. For example, those systems include a number of moving parts which render them more expensive to manufacture, install and maintain than is desirable. Further, due to their size and complexity, these system are readily visible when installed on a structure and therefore may detract from its visual aesthetics. Moreover, such prior systems are designed for use on relatively long, narrow window ledges and are thus not suitable to protect structure openings or structure surfaces of a variety of shapes and sizes. For instance, it is believed that those systems would not be suitable for protecting the following: gutters, light poles, openings in bell towers, or the surface of a structure having substantial width. Accordingly, there is a need for a bird repellant system that is inexpensive to manufacture, install, and maintain; that can be camouflaged to blend into its surroundings; and that is flexible enough to provide a barrier for structure surfaces and openings having a wide variety of shapes and sizes.

SUMMARY OF THE INVENTION

The present invention includes a novel line barrier system for repelling a bird from a desired portion of a structure which includes, a plurality of modular supports having a base for mounting to the structure, with the supports having at least one projecting member extending in a fixed position from said base; a fastener for mounting said plurality of modular supports to the structure; and, at least one line fixedly attached to said projecting member on more than one of said plurality of modular supports to provide a line barrier between the bird and the structure. The modular nature of the supports provides for simple and inexpensive manufacture, installation, and maintenance of the system of the present invention. It also provides the system of the invention with a great deal of flexibility in configuring the line barrier to protect a wide variety of shapes and sizes of structure surfaces and structure openings. Further, the simple design of the system having modular supports with fixed projections and fixedly attached lines to more than one of the modular supports helps reduce the expense of manufacture, installation and maintenance of the system.

In one embodiment of the invention, a novel modular support for securing line of a line barrier system is provided having a base which is adapted to be fixedly secured to a structure. The base has at least one projecting member extending at a fixed angle from the top surface of the base. At least one of the projecting members has at least one line receiving member for fixedly receiving at least one line of the line barrier. Preferably, the base of the modular support is adapted to be secured to the structure by the provision of an aperture through the base which is sized to receive a fastener. Optionally, the base of the modular support may be adapted to be secured to the structure by providing a planar lower surface having a surface material which will readily bond to an adhesive chosen for its ability to bond with both the surface material of the support and the surface material of the structure.

In another embodiment of the invention, a novel method of installing a line barrier system for repelling birds from a desired portion of a structure is provided. The method includes the following steps: (a) determining the orientation and number of lines required to create a line barrier sufficient to repel birds from a desired portion of a structure; (b) determining the number and location of modular supports required to support the determined orientation and number of lines; (c) securing the determined number of modular supports in the determined locations to the surface of the structure to support the determined orientation and number of lines; and (d) attaching the determined number of lines in the determined orientation to the determined number of modular supports to create a line barrier system sufficient to repel birds from a desired portion of the structure. In the system of the invention, the number of lines and their orientation is to a large extent determined by the installer based on the size and geometry of the desired portion of the structure to be protected and the size of the bird to be repelled. In this regard, the gaps between the lines of the barrier will be smaller for barriers designed to repel smaller birds, and can be larger, if the barrier is intended to repel only larger birds, such as pigeons or seagulls. Ideally, the gaps would be no smaller than the average size of the bird to be repelled, but may be larger if the undesirable bird species is effectively repelled with a line barrier having larger gaps. When relatively large sized areas or structure openings are to be protected from birds, it is likely that more complex line barriers having larger numbers of line and more complex interactions will need to be created.

In another preferred embodiment, a novel system and method of installing a line barrier to repel birds from a portion of a structure having a substantial width relative to the length of the modular base is provided. In this preferred system and method, it is determined that at least one line of the barrier should be oriented along the periphery of at least a portion of the structure to be protected from birds and that at least three modular supports spaced apart in a non-linear arrangement at locations along the periphery are necessary to support the line barrier. For purposes of this application, a non-linear arrangement means that, when at least three supports are arranged within the desired portion of the structure to be protected, a line extending between two adjacent supports will not intersect the third support. The determined number of supports are then secured in the determined locations and the determined number and orientation of the lines are secured to the support so that a line barrier is created. Optionally, it may be determined that at least one line should be oriented to intersect the portion of the structure to be protected. In which case, at least one line is secured to at least two of the modular supports positioned opposite each other across the periphery of the portion of the structure to be protected.

In another preferred embodiment of the system and method of the invention, a novel system and method of installing a line barrier to repel birds from a portion of a structure having substantial width relative to the length of the modular base is provided. It may be determined that the line barrier system should include at least three modular supports spaced apart in a non-linear arrangement with one support positioned in the interior of the portion of the structure from which birds are to be repelled. It is further determined that at least one line should be fixedly attached on one end to at least one projecting member on the support located within the interior of the portion of the structure to be protected and fixedly attached on the other end to at least one other modular support. The determined number of supports are then secured in the determined locations and the determined number and orientation of the lines are secured so that they create a line barrier. In some cases, it will be determined that a plurality of lines oriented to intersect the desired portion of the structure to be protected are required and additional lines running between additional supports either within the interior of the portion of the structure to be protected or positioned opposite each other across the portion of the structure to be protected may be provided. Optionally, it may be determined that at least one line should be oriented along the periphery of the portion of the structure to be protected and be secured to at least two modular supports positioned along the periphery of the portion of the structure to be protected.

In another preferred embodiment of the system of the invention, the projecting member of the modular support is a pair of posts extending substantially perpendicularly from the base of the support and having at least one ring extending from said projecting member for fixedly attaching said at least one line. The ring is adapted to secure the line preferably by tying around the ring and may optionally be secured with a bit of adhesive. The base of the modular support preferably has at least one aperture adapted to receive at least one fastener.

In another embodiment of the invention, a kit is provided which preferably includes a plurality of modular supports for securing a line barrier, a plurality of fasteners, and at least one line which may be cut to the desired length(s). The kit may optionally include an adhesive for use in securing the modular supports to a structure as an alternative to use of a fastener. The kit may also optionally include an adhesive which assists in binding the line after it is tied to one of the support means.

BRIEF DESCRIPTION OF THE DRAWINGS

FIG. 1 is a perspective view of a modular support in accordance with the present invention showing the modular support and screw for mounting the support to the ledge of a window;

FIG. 2 is an plan view of a line barrier system in accordance with the present invention mounted to a window ledge being substantially wider than the length of the modular supports; FIG. 3 is a side view taken along lines 3—3 of FIG. 2 showing a line barrier system secured to modular supports;

FIG. 4 is an plan view of a line barrier system in accordance with the present invention mounted to a narrow window ledge having a width substantially equal to the length of the modular supports; FIG. 5 is a side view of a line barrier system in accordance with the invention covering an opening in a structure;

FIG. 6 is a partial plan view of a line barrier system of the present invention mounted to a gutter;

FIG. 7 is a side sectional view taken along lines 7–7 of FIG. 6 showing the modular supports of the line barrier system mounted to the mounting straps of the gutter; and FIG. 8 is a plan view of a line barrier system installed on the top of rectangular air conditioning unit.

DETAILED DESCRIPTION OF THE PREFERRED EMBODIMENT

A modular support 20 for creating a line barrier system 22 of one preferred embodiment of the invention is shown in FIG. 1 mounted to a window ledge 24. As can be seen in FIGS. 2, 5, 6 and 8, a line barrier system of the invention 22 may be created by securing at least one line 25 to a plurality of modular supports 20. Line 25 is preferably a translucent, relatively thin monofilament line of the type used for light sport fishing, but heavier lines and lines made from other materials may be used. The use of modular supports in the system of the invention provides a great deal of flexibility in configuring the line barrier systems of the invention to the size and shape of the portion of a structure to be protected from bird landing, nesting and roosting or from entry into the interior of a structure.

As shown in FIG. 1, the modular support 20 has a base 26 which may be mounted to the window ledge 24 preferably by a screw 28 through aperture 30 which is sized to accept the screw 28. Optionally, a variety of fasteners other than a screw may be used such as, nails, staples, rivets, or an adhesive chosen to bind to both the surface of a structure and the modular support 20. The base 26 of the modular support 20 is preferably substantially planar having a front surface 32 and back surface 34. In the preferred embodiment shown in FIG. 1, a pair of projecting members 36 extend from the front surface 32 of the base 26 of the modular support 20. A ring 38 extends from each projecting members 36 to which one or more lines of the line barrier system may be attached. In this preferred embodiment, the differing length of the projecting members assures that the pair of rings 38 are maintained at different heights above the structure so that the lines attached thereto are maintained at more than one level. It is contemplated that a single projecting member and ring or additional projecting members and rings could extend from the base of the modular support, if desired. Further, while the ring structure 38 for attaching the lines is preferred, it is contemplated that other structures could be provided on the projecting member 36 for attaching lines, such as a T-bar, L-bar, knob structure or other ring structures extending from the projecting member (not shown).

As can be seen in FIG. 3, the projecting members 36 and rings 38 are relatively short, having a preferred total height of less than 3 inches. The modular supports, therefore, provide the line barrier system of the invention with a low profile when seen from the side. This low profile helps insure that the line barrier system of the invention is relatively unobtrusive when viewed from the side or from below. The low profile of the line barrier system is also a significant safety feature since it allows a human to step on top of the line barrier in the event of a fire or other emergency where one must exit through a window and onto a window ledge or other protected structure. With prior line barrier systems having significantly higher profiles, a human occupant may find it difficult or impossible to step on or over such barriers.

The modular support 20 is preferably a unitary structure fashioned from a suitable resin by injection molding. The plastic resin used to form the modular supports 20 may be tinted in a wide variety of colors to match the color of the ledge or other portion of a structure to which it is attached. If desired, the line barrier system of the invention may be constructed with translucent monofilament lines along with a color matched or translucent modular supports to provide a line barrier system with enhanced camouflage properties. In any event, the small size, simple design and low profile of the modular unit help to hide from view the line barrier system of the present invention.

Referring now to FIG. 2, a line barrier of the present invention 22a is provided by attaching four lines 25ac, 25bd, 25ad and 25bc respectively, to four modular supports 20a, 20b, 20c, and 20d to protect the surface of a window ledge 24a. The window ledge has a width which is substantially wider than the length of the modular supports 20a–20d yet can be efficiently protected from birds using a small number of modular supports and lines. The four lines 25ac, 25bd, 25ad and 25bc are preferably fixedly attached to each of eight rings 38a1–38d2 of the four modular supports 20a–20d. To efficiently cover the desired portion of the ledge 24a from which birds are to be repelled, two pairs of modular supports 20a, 20b and 20c, 20d are mounted at each end of the ledge at the peripheral ledge corners. Lines 25a and 25b run along the periphery of the ledge 24a and are attached to the rings 38a1–38d2 of the modular supports located the ledge 24 on the opposite end of the ledge 24, that is, line 25ac is attached to rings 38a1 and 38c1 of modular supports 20a, 20c and line 25bd is attached to rings 38b2 and 38d2 of modular supports 20b, 20d. Lines 25ad and 25bc intersect the interior of the area bounded by the periphery of the ledge 24a and terminate at modular supports 20a–20d located across the ledge 24a. Line 25ad is attached to modular supports 20a and 20d at rings 38a2 and 38d1, respectively, and crosses line 25bc near the center point of the ledge 24; line 25bc is attached to modular supports 20b and 20c at rings 38b1 and 38c2. While lines 25ad and 25bc are shown in their preferred crossing arrangement for efficient coverage of ledge 24a, it is contemplated that such interior lines to can be configured to run parallel to one another, that is, a line from 38a2 to 380c2 and a line from 38b1 to 38d1 (not shown), if desired.

The four lines 25ac, 25bd, 25ad and 25bc are preferably fixedly attached to each of the eight rings 38a1 through 38d2 by first tying and then applying a small amount of adhesive to the knot to prevent the knot from slipping on the monofilament line. It also contemplated that lines may be fixedly attached at one end and then looped through or around one or more rings prior to being fixedly attached at its other end. For example, rather than fixedly attaching each end of the four lines as shown in FIG. 2, a similar line barrier could be constructed by the use of a single line with one end fixedly attached at ring 38a1 and the second end looped through or around rings 38c1, 380c2, 38b1, 38b2, 38d2, and 38d1, respectively, with the second end fixedly attached at 38a2. In the line barrier systems of the present invention, fixed attachment of a line to more than two supports is preferred if looping the line through rings or wrapping the line around rings is contemplated since such looping or wrapping of the line through a number of rings could lead to failure of a significant amount of line of the line barrier should one of the looped or wrapped segments break during use.

In the embodiment of the invention shown in FIG. 4, the ledge 24b has a width substantially equal to the length of the modular supports 20e and 20f. Accordingly, to accommodate such a narrow ledge, as few as two supports and two fixedly attached lines may be used to provide a line barrier system 22b of the invention. Modular supports 20e and 20f are preferably located at opposite ends of the ledge and are oriented lengthwise across the width of the ledge 20b. Line 25ef1 is run along one peripheral sided of the ledge 24b and fixedly attached to rings 38e1 to 38f1, and line 25ef2 is run along the other peripheral side of the ledge 24b and fixedly attached to rings 38e2 to 38f2. In the line barrier system of the present invention, it is contemplated that substantially longer structures than the ledges shown in FIGS. 2 and 4 may require additional modular supports spaced intermediate to end supports along the length of a line to prevent the line from sagging over long distances. It is believed that the preferred distance to space apart such intermediate supports is about every 3 feet, although greater distances for spacing may be used.

In the embodiment of the invention shown in FIG. 5, an opening 40 in a structure (not shown) is covered by a line barrier system 22c of the present invention. The line barrier 22c is intended to prevent birds from entering the opening 40 in the structure or from roosting, landing, or nesting on the bottom ledge 42 of the opening 40. The modular nature of the supports 20 allows for a great deal of flexibility in design of line barrier system to protect such an opening. In FIG. 5, ten modular supports 20g–20p are shown in the preferred position mounted to the surface 39 defining the interior of the opening 40. It is contemplated that the supports may also be mounted on the exterior surface 41 of the structure adjacent to the opening 40, if desired. It is further contemplated that greater or fewer numbers of supports and lines may be required to provide an effective barrier to a structure opening depending upon the size and shape of the opening and the size of the bird species to be repelled. For line barrier systems designed for certain openings such as shown in FIG. 5, it may be desirable to use modular supports with a single projecting member and single ring.

As shown in FIG. 5, each of the nine lines 25gp–25mp of the line barrier are attached on one end to one of the nine modular supports 20g–20m and on the other end to the centrally located modular support 25p mounted to the bottom ledge 42. Line 25gp is attached to modular support 25g and 25p; line 25hp is attached to modular support 25h and 25p; line 25ip is attached to modular support 25i and 25p; line 25jp is attached to modular support 25j and 25p; line 25kp is attached to modular support 25k and 25p; line 25lp is attached to modular support 25l and 25p; and line 25mp is attached to modular support 25m and 25p. It is also contemplated that lines could be attached to modular supports located on opposite sides of the opening rather than attaching one end of each of the lines to a centrally mounted support 25p. For example, a line barrier could also be created to protect the opening depicted in FIG. 5 by attaching lines to the following pairs of modular supports: 20g and 20o, 20h and 20n, 20i and 20m, 20j and 20l, as well as 20k and 20p (not shown).

In the embodiment of the invention shown in FIG. 6, a gutter 44 protected by a line barrier system 22d is shown in a partial view. The gutter and barrier extending beyond the portion shown as indicated. The modular supports 20q–20s are mounted to the strap mounts 46a–46c which mount the gutter 44 to a building (not shown). Line 25q is spaced above the gutter 44 along its front wall and is fixedly attached to rings 38q1 and looped through lines 38r1 and 38s1 and fixedly attached to at least one other modular support along the length of the gutter (not shown). Line 25r is spaced above the gutter 44 along its back wall and is fixedly attached to ring 38q2 and looped through 38r2 and 38s2 and fixedly attached to at least one other modular support along the length of the gutter (not shown). For the relatively short spans between modular supports as shown in FIG. 6, it is preferred that the lines be looped through or around at least some of the intermediately spaced supports, as for example 38r1, 38s1, 38r2 and 38s2 and intermittently fixedly attached to at least some of the intermediate supports along the length of the gutter. The small size and light weight of the modular supports 20q–20s make it possible to mount a line barrier system of the invention to a relatively flimsy gutter made or aluminum or other relatively thin light weight metal. The gutter 44 shown in FIG. 6 is relatively narrow having a width which is substantially the same as the length of modular supports 20q–20s. As a result, only a single modular supports per mount strap 46 is required to provide an effective line barrier to the gutter 44. It is contemplated that the line barrier system of the invention could be used with wider gutters that may require more than one modular support per support strap of the gutter and more than two fixedly attached lines to form an effective line barrier.

In the embodiment of the invention shown in FIG. 8, a line barrier system 22d of the present invention is shown mounted to the top of a rectangular air conditioning unit 48. Six modular supports 20t–20z are mounted preferably by sheet metal screws (not shown) and optionally by using adhesive on the top of the air conditioning unit 48. Four modular supports 20t–20w are mounted at an angle on the four outside corners of the air conditioning unit 48, and two modular supports 20x and 20y are mounted at the center of the air conditioning unit 48. The modular supports 20x and 20y are preferably mounted with the same sheet metal screw and angled relative to one another. Four lines 25tu, 25tv, 25tw and 25vw are attached to the outer pairs of rings of the corner-mounted modular supports 20t–20w, that is, lines are mounted to ring pairs 38t1, 38u1; 38t1, 38v1; 38v1, 38w1; and 38v1, 38w1. Four lines 25tx, 25uy, 25wx and 25vy are attached to the inner rings of the corner-mounted modular support 20t–20w and the rings of the center-mounted modular supports 20x–20y, that is lines attached to ring pairs 25t2, 25x1; 25v2, 25y2; 25w2, 25x2; and 25v2, 25y1. Preferably, as shown in FIG. 8, each of the lines is fixedly attached to rings 38t1–38y2. Optionally, one or more of the lines may be looped through or around one or more rings, if desired, to ease installation of the line barrier. It is contemplated that additional lines and support might be added to the line barrier of FIG. 8 if it was desired to repel relatively small birds from the top of the air conditioning unit 48. For example, four additional supports (not shown) could be mounted midway between each of the corner-mounted modular supports along the periphery of the air conditioning unit and a pair of lines could be run between each oppositely mounted pair of four additional modular supports. Such additional line could be looped around or through the rings of the center mounted supports for additional support to prevent line sagging.

It is contemplated that the line barrier system of the invention may be used on a wide variety of structures such as, light poles, gutters, window ledges, fences, bell towers, roof tops, or air conditioner units. It is further contemplated that the portion of the structure to be protected from birds may be all or part of a surface of the structure or may be an opening in a structure, as for example, the opening in a bell tower.

While there have been illustrated and described particular embodiments of the present invention, it will be appreciated that numerous changes and modifications will occur to those skilled in the art, and it is intended in the appended claims to cover all those changes and modifications which fall within the true spirit and scope of the present invention.

What is claimed is:

1. A line barrier system for repelling a bird from a desired portion of a structure, comprising:
    a plurality of modular supports having a base for mounting to the structure, said base having at least a pair of post members extending substantially perpendicular from said base;
    fasteners for mounting said plurality of modular supports to the structure; and
    at least one generally translucent line fixedly attached to at least one projecting member on more than one of said plurality of modular supports to provide a generally translucent line barrier between the bird and the structure while reducing the overall visibility of the barrier system.

2. The system of claim 1, wherein at least three modular supports are spaced apart and mounted in non-linear arrangement along a periphery of the desired portion of the structure from which birds are to be repelled, and at least one line is fixedly attached to at least one projecting member on a plurality of said at least three modular supports such that a line barrier system is created along at least a portion of the periphery of said desired portion of the structure from which birds are to be repelled, whereby the system is capable of repelling birds from a desired structure that is substantially wider than the modular support.

3. The system of claim 2, wherein said at least three modular supports are mounted in position near corner areas of said portion of the structure from which birds are to be repelled, whereby the system is capable of repelling birds from a desired structure with at least three corner areas defining its periphery.

4. The system of claim 3, wherein a fourth modular support is secured in a position near a fourth corner area, whereby the system is capable of repelling birds from a desired structure with a fourth corner area defining its periphery.

5. The system of claim 1, wherein at least three modular supports are spaced apart and mounted in a non-linear arrangement on a surface of said structure, at least one said modular support is positioned within said desired portion of the structure from which birds are to be repelled, and at least one line is attached to at least one post member of said modular support within said desired portion of the structure from which birds are to be repelled and to at least one other of said at least three modular supports, whereby the system is capable of repelling birds from a desired structure that is substantially wider than the modular support.

6. The system of claim 1, wherein at least four modular supports are spaced apart and mounted in a non-linear arrangement along a periphery of the desired portion of the structure from which birds are to be repelled, at least two of said at least four modular supports are positioned across said desired portion of the structure from which birds are to be repelled, and at least one line is attached to at least one post member on each of at least two modular supports positioned across said desired portion of the structure from which birds are to be repelled such that a line barrier is created with at least one line intersecting a substantial portion of the desired portion of the structure from which birds are to be repelled, whereby the system is capable of repelling birds from a desired structure that is substantially wider than the modular support.

7. The modular system of claim 1, wherein said post members have at least one ring portion extending from each post for supporting said at least one line.

8. The modular system of claim 1, wherein said support has at least one aperture adapted to receive at least one fastener.

9. The modular system of claim 1, wherein said at least one fastener is a screw.

10. The modular system of claim 1, wherein said at least one fastener is an adhesive selected for its ability to bond to a surface of said base and to a surface of said structure.

11. A modular support for securing generally translucent lines of a line barrier system to repel birds from a structure, comprising:

a base having top and bottom surfaces; said base have at least one portion adapted to fixedly secure the base to the structure;

at least a pair of posts extending at a fixed angle from said top surface of said base; and line supporting members extending from said posts for receiving at least one generally translucent line of the line barrier to provide a line barrier between the bird and the structure while reducing the overall visibility of the barrier system.

12. The modular support of claim 11, wherein said posts and said line supporting members extend only a short distance above said base so that the modular support is provided with a low profile when viewed from the side.

13. The modular support of claim 11, wherein at least one of said posts extends substantially perpendicularly from said top surface of said base.

14. The modular support of claim 11, wherein said line receiving members have at least one ring extending from at least one of said pair of posts.

15. The modular support of claim 11, wherein each of said pair of posts extends a different length from said base such that a ring extending from each of said pair of posts is maintained at a different height from said top surface of said base.

16. The modular support of claim 11, wherein said base has at least one aperture sized to receive a fastener to fixedly secure the base to the structure.

17. The modular support of claim 11, wherein said base has a generally planar bottom surface formed of a material that bonds to an adhesive for fixedly securing the base to a surface of the structure.

18. The modular support of claim 11 wherein said base is provided with coloring component which substantially matches a color of the portion of the structure to which said base is secured in order to make the modular support visually blend with the structure.

19. A kit for assembly of a line barrier system for repelling birds from a structure comprising:

a plurality of modular supports for receiving at least one generally translucent line of the line barrier, each support having a base with top and bottom surfaces and having at least a pair of post members extending from the top surface of each base;

a plurality of fasteners for securing said plurality of modular supports to said structure; and at least one generally translucent line for receipt by said plurality of modular supports to create a line barrier while reducing the overall visibility of the barrier system.

20. A kit in accordance with claim 18, wherein said kit includes an adhesive for fixedly attaching said at least one line to said plurality of modular supports.

21. A kit in accordance with claim 19, wherein said kit includes an adhesive adapted to secure the plurality of modular supports to the structure.

22. A method for installing a line barrier system for repelling birds from a structure, comprising:

determining the orientation and number of generally translucent lines sufficient to create a line barrier system to repel birds from a desired portion of a structure;

determining the number and location of modular supports having bases with top and bottom surfaces and having at least a pair of post members extending from the top surface of each base that are required to support the determined orientation and number of lines sufficient to create the line barrier system;

mounting the determined number of modular supports in the determined locations to the surface of the structure to support the determine orientation and number of lines sufficient to create the line barrier system; and attaching the determined number of generally translucent lines in the determined orientation to the determined number of modular supports to create a line barrier system to repel birds from a desired portion of a structure while reducing the overall visibility of the barrier system.

23. A method according to claim 22 in which the desired portion of the structure to be protected is substantially wider than the modular support, the method further comprising determining the number and orientation of lines sufficient to repel birds from said desired portion of the structure, including at least one line oriented along at least a portion of a periphery of the desired portion of the structure to be protected, and using at least three modular supports spaced apart and arranged in a non-linear arrangement along the periphery of said portion of the structure to be protected to support the determined orientation and number of lines to create the line barrier system.

24. A method in accordance with claim 23, wherein the method comprises attaching the desired number of lines in the determined orientation to create a line barrier over an opening defined by the structure to be protected.

25. A method in accordance with claim 22 in which the desired portion of the structure to be protected is substantially wider than the modular support, the method further comprising determining the number and orientation of lines sufficient to repel birds from said desired portion of the structure, including at least one line oriented from side-to-side across the desired portion of the structure to be protected, and using at least two modular supports mounted across peripheral sides of said desired portion of the structure to be protected to support the line oriented from side-to-side across the desired portion of the structure to be protected.

26. A method according to claim 22 in which the desired portion of the structure to be protected is substantially wider than the modular support, the method further comprising determining the number and orientation of lines sufficient to repel birds from said desired portion of the structure, including at least one line oriented to intersect the desired portion of the structure to be protected, and using at least one modular support of at least three modular supports to be spaced apart and arranged in a non-linear arrangement to be located in an interior region of said portion of the structure to be protected and to support at least one line oriented to intersect the desired portion of the structure to be protected.

27. A line barrier system for repelling a bird from a desired portion of a structure comprising:

a plurality of modular supports having a base for mounting to the structure, said base having first and second post members extending in fixed positions from the base, wherein each post member defines an aperture for receiving at least one generally translucent line;

fasteners for mounting the plurality of modular supports to the structure; and at least one generally translucent line fixedly attached to at least one post member on more than one of said plurality of modular supports to provide a generally translucent line barrier between the bird and the structure while reducing the overall visibility of the barrier system.

* * * * *

UNITED STATES PATENT AND TRADEMARK OFFICE
CERTIFICATE OF CORRECTION

PATENT NO.    : 6,418,674 B1
DATED         : July 16, 2002
INVENTOR(S)   : Robert Deraedt It is certified that error appears in the above-identified patent and that said Letters Patent is hereby corrected as shown below:

<u>Column 8,</u>
Lines 47, 50, 53 and 55, change "comer" to -- corner --.

Signed and Sealed this

Twenty-second Day of April, 2003

JAMES E. ROGAN
*Director of the United States Patent and Trademark Office*